US007643466B2

(12) United States Patent
Lee et al.

(10) Patent No.: US 7,643,466 B2
(45) Date of Patent: Jan. 5, 2010

(54) METHOD AND SYSTEM FOR USING EITHER PUBLIC OR PRIVATE NETWORKS IN 1XEV-DO SYSTEM

(75) Inventors: Jun-Hyuk Lee, Suwon-shi (KR); Doo-Yong Yang, Seoul (KR); Hae-Young Choi, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 372 days.

(21) Appl. No.: 10/657,278

(22) Filed: Sep. 9, 2003

(65) Prior Publication Data

US 2004/0048601 A1 Mar. 11, 2004

(30) Foreign Application Priority Data

Sep. 10, 2002 (KR) ............. 10-2002-0054625

(51) Int. Cl.
*H04L 12/28* (2006.01)

(52) U.S. Cl. .......... 370/351; 370/352; 370/353; 370/356; 455/445; 455/465; 455/462; 455/554.1; 709/228

(58) Field of Classification Search .......... 455/410, 455/411, 555, 464, 465, 62.11, 63.13, 161.3, 455/185.1, 62, 452.1, 452.2, 462, 554.1, 455/426.1; 370/351, 352, 353, 356; 709/228
See application file for complete search history.

(56) References Cited

U.S. PATENT DOCUMENTS 5,590,133 A * 12/1996 Billstrom et al. ............ 370/349

(Continued)

FOREIGN PATENT DOCUMENTS

JP 9-130405 5/1997

(Continued)

OTHER PUBLICATIONS

Stevens (TCP/IP Illustrated Volume, ISBN 0201633469, Addison Wesley, 1994, p. 37-41, 189-208).*

(Continued)

*Primary Examiner*—Vincent P Harper
*Assistant Examiner*—Dung Lam
(74) *Attorney, Agent, or Firm*—Robert E. Bushnell, Esq.

(57) ABSTRACT

A high-speed wireless data system for providing services for either a public wireless network terminal or a private wireless network terminal, the system comprising: a base station for assigning an Unicast Access Terminal Identifier to each of terminals of the public wireless network and the private wireless network through a wireless channel to provide services of the high-speed wireless data system for each of the terminals; a base station controller for controlling implementation of different authentications for the terminals, assignment of an Unicast Access Terminal Identifier to each terminal, management of a session for each terminal, and data transmitted or received by each terminal; a private authentication system including an authentication database for authenticating the private wireless network terminal; a data location register including service information of the public wireless network terminal and information for receiving services from the private wireless network of the private wireless network terminal; and a hub for intermediating data between the base station, the base station controller, and the private authentication system, the hub discriminating between private wireless network services and public wireless network services by means of Unicast Access Terminal Identifiers received from the terminals.

8 Claims, 4 Drawing Sheets

U.S. PATENT DOCUMENTS

| | | | |
|---|---|---|---|
| 6,212,395 B1* | 4/2001 | Lu et al. | 455/463 |
| 6,535,732 B1* | 3/2003 | McIntosh et al. | 455/445 |
| 6,697,355 B1* | 2/2004 | Lim | 370/352 |
| 6,970,719 B1* | 11/2005 | McConnell et al. | 455/554.1 |
| 2001/0046214 A1* | 11/2001 | Kang | 370/328 |
| 2001/0046860 A1* | 11/2001 | Lee | 455/426 |
| 2002/0022497 A1* | 2/2002 | Kim et al. | 455/554 |
| 2002/0196749 A1* | 12/2002 | Eyuboglu et al. | 370/328 |
| 2003/0139180 A1* | 7/2003 | McIntosh et al. | 455/426 |

FOREIGN PATENT DOCUMENTS

| | | |
|---|---|---|
| JP | 9-135479 | 5/1997 |
| JP | 2001-203744 | 7/2001 |

OTHER PUBLICATIONS

Stevens (TCP/IP Illustrated Volume, ISBN 0201633469, Addison Wesley, 1994, p. 37-41, 111-116, 189-208).*

*Office Action* from the Japan Patent Office issued in Applicant's corresponding Korean Patent Application No. 10-2002-0054625 dated Nov. 8, 2005.

* cited by examiner

METHOD AND SYSTEM FOR USING EITHER PUBLIC OR PRIVATE NETWORKS IN 1XEV-DO SYSTEM

CLAIM OF PRIORITY

This application makes reference to, incorporates the same herein, and claims all benefits accruing under 35 U.S.C. § 119 from my application METHOD AND SYSTEM FOR USING TO SHARE PUBLIC AND PRIVATE NETWORK IN 1X EV-DO SYSTEM filed with the Korean Industrial Property Office on Sep. 10, 2002 and there duly assigned Serial No. 54625/2002.

BACKGROUND OF THE INVENTION

1. Technical Field

The present invention relates to a system and a method for using public network systems in a private network, and more particularly to a system and a method for using public network systems for mobile communication in a private network.

2. Related Art

Mobile communication systems have been further developed in order to provide mobility of voice calls. Due to technical developments in an attempt to meet the demands of users, mobile communication systems mainly for voice calls can now provide short data services. That is, mobile communication systems provide not only voice call services, but also additional services, such as short message transmission, music file transmission for bell sounds of wireless terminals, simple Internet communications, banking services, and other services.

Studies have been performed to try to develop mobile communication systems which can provide the mobile communication subscribers with not only the services mentioned above, but also more information at higher speed.

There appears to be a need for a new, improved, convenient, and efficient method and system enabling users to access public wireless networks and private wireless networks in a 1X EV-DO system, to receive information at a high-speed rate, for video conference calls, to watch movies received from one of the wireless networks, and for other reasons. Also, there is a requirement to provide low-priced base stations and base station controllers while providing the new, improved method and system in a 1X EV-DO system.

SUMMARY OF THE INVENTION

Accordingly, the present invention has been made to solve the above-mentioned problems and to provide a system and a method for using either a public network or a private network in a high-speed wireless data system.

The present invention provides a system and a method for using either a public network or a private network in a high-speed wireless data system at low cost.

The present invention provides a system and a method for using either a public network or a private network in a high-speed wireless data system without making any particular change in the system.

The present invention provides a high-speed wireless data system for providing services for either a public wireless network terminal or a private wireless network terminal, that may be constructed with a base station for assigning a temporary identifier, namely an Unicast Access Terminal Identifier (i.e., an "UATI") to each of terminals of the public wireless network and the private wireless network through a wireless channel to provide services of the high-speed wireless data system for each of the terminals; a base station controller for controlling implementation of different authentications for the terminals, assignment of an Unicast Access Terminal Identifier to each terminal, management of a session for each terminal, and data transmitted or received by each terminal; a private authentication system including an authentication database for authenticating the private wireless network terminal; a data location register including information for the public wireless network terminal and information for receiving services from the private wireless network of the private wireless network terminal; and a hub for intermediating data between the base station, the base station controller, and the private authentication system, the hub discriminating between private wireless network services and public wireless network services by means of Unicast Access Terminal Identifiers received from the terminals.

The base station and the base station controller assign an Internet protocol (IP) address for performing an IP telecommunication, and processing data and signaling for the assigned address.

The system may further include a data service node connected to the hub to provide data services only to the terminal of the private wireless network.

In a case where a terminal of the private wireless network is also used in the public wireless network, the data location register stores terminal information of both the private wireless network and the public wireless network in the terminal and assigns an Unicast Access Terminal Identifier of the private wireless network to the terminal when the terminal is located within a predetermined base station.

The data location register assigns an Unicast Access Terminal Identifier of the private network to a corresponding terminal, when the terminal is located within a predetermined base station in a predetermined time zone.

The hub discriminates between private wireless network services and public wireless network services by means of Unicast Access Terminal Identifiers received from the terminals in connecting a call.

In accordance with another aspect of the present invention, there is provided a call out method by a high-speed wireless data system, the system may be constructed with a hub and a base station controller, the hub discriminating between public wireless network services and private wireless network services in performing routing, the base station controller performing a control operation to provide services of a private wireless network if required from the hub. When a call out is demanded from a predetermined terminal through a base station, the base station controller checks an Unicast Access Terminal Identifier and a destination address received from the terminal by the hub to determine whether private wireless network services are required or not; if private wireless network services are required, the hub connects a call to the base station and the base station controller; the base station controller checks through a private authentication system whether the terminal has been authenticated or not; and when the terminal has been authenticated, the base station controller sets the call to the requested destination address to perform communication. This method may record a location of the terminal upon completion of the communication.

In accordance with another aspect of the present invention, there is provided a call in method by a high-speed wireless data system, with the system using a hub and a base station controllers the hub discriminates between public wireless network services and private wireless network services in performing routing, the base station controller performing a control operation to provide services of a private wireless network if required from the hub. With this call-in method, when a call connection is required to a predetermined terminal from a predetermined packet data service node, the base station controller demanding a paging to the location register; the location register providing an answer signal and a paging signal to a corresponding base station controller where the terminal is located; performing the paging to the terminal by the base station controller which has received the paging signal; when the paging answer signal is received from the terminal, authenticating the terminal through an authentication system; and performing communication between the terminal and the packet data service node upon completion of the authentication. This method may further comprise a step of recording a location of the terminal upon completion of the communication.

In accordance with the principles of the present invention, as embodied and broadly described, the present invention provides a high-speed wireless information distribution system providing services, with a data system providing services to at least one selected from among a public wireless network terminal and a private wireless network terminal, the services corresponding to at least one selected from among data services of a public wireless network and data services of a private wireless network. The data system may be constructed with a base station assigning a first an Unicast Access Terminal Identifier to the public wireless network terminal and a second an Unicast Access Terminal Identifier to the private wireless network terminal through wireless communication; a base station controller controlling authentication of the terminals, controlling the assignment of the first and second Unicast Access Terminal Identifiers, controlling sessions of the terminals, and controlling data transmitted and received by the terminals; a private authentication system storing an authentication database for the authentication of the private wireless network terminal; a data location register storing information corresponding to the public wireless network terminal, and storing information for transmitting the data services of the private wireless network to the private wireless network terminal; and a hub intermediating data between said base station, said base station controller, and said private authentication system, said hub being in communication with said data location register, said hub distinguishing the data services of the private wireless network and the data services of the public wireless network in dependence upon the assigned first and second an Unicast Access Terminal Identifiers received from the terminals.

In accordance with the principles of the present invention, as embodied and broadly described, the present invention provides a call out method of a high-speed wireless data system. When a call out to a destination is requested from a terminal, determining whether private wireless network services are required, said determining being performed in dependence upon an address of the destination and an Unicast Access Terminal Identifier received from the terminal; when the private wireless network services are required, connecting the call to a first base station controller; detecting whether the terminal has been authenticated, said detecting being performed through a private authentication system; and when the terminal has been authenticated, establishing a connection to the requested destination address to perform communication.

In accordance with the principles of the present invention, as embodied and broadly described, the present invention provides a call in method of a high-speed wireless data system, the call in method comprising: when a call connection is required to a predetermined terminal from a predetermined packet data service node, transmitting a first paging request to a location register from a first base station controller, the system including a hub and at least the first base station controller; the hub distinguishing public wireless network services and private wireless network services in performing routing; transmitting a first paging response from the location register to the first base station controller in response to the first paging request; providing a paging signal to a second base station controller, the second base station controller controlling a base station where the terminal is located, the second base station controller being selected from among the first base station controller and a plurality of additional base station controllers; paging the terminal from the second base station controller in response to the paging signal; when a paging answer signal is received from the terminal in response to said paging, authenticating the terminal through an authentication system; and performing communication between the terminal and the packet data service node when said authenticating is completed.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
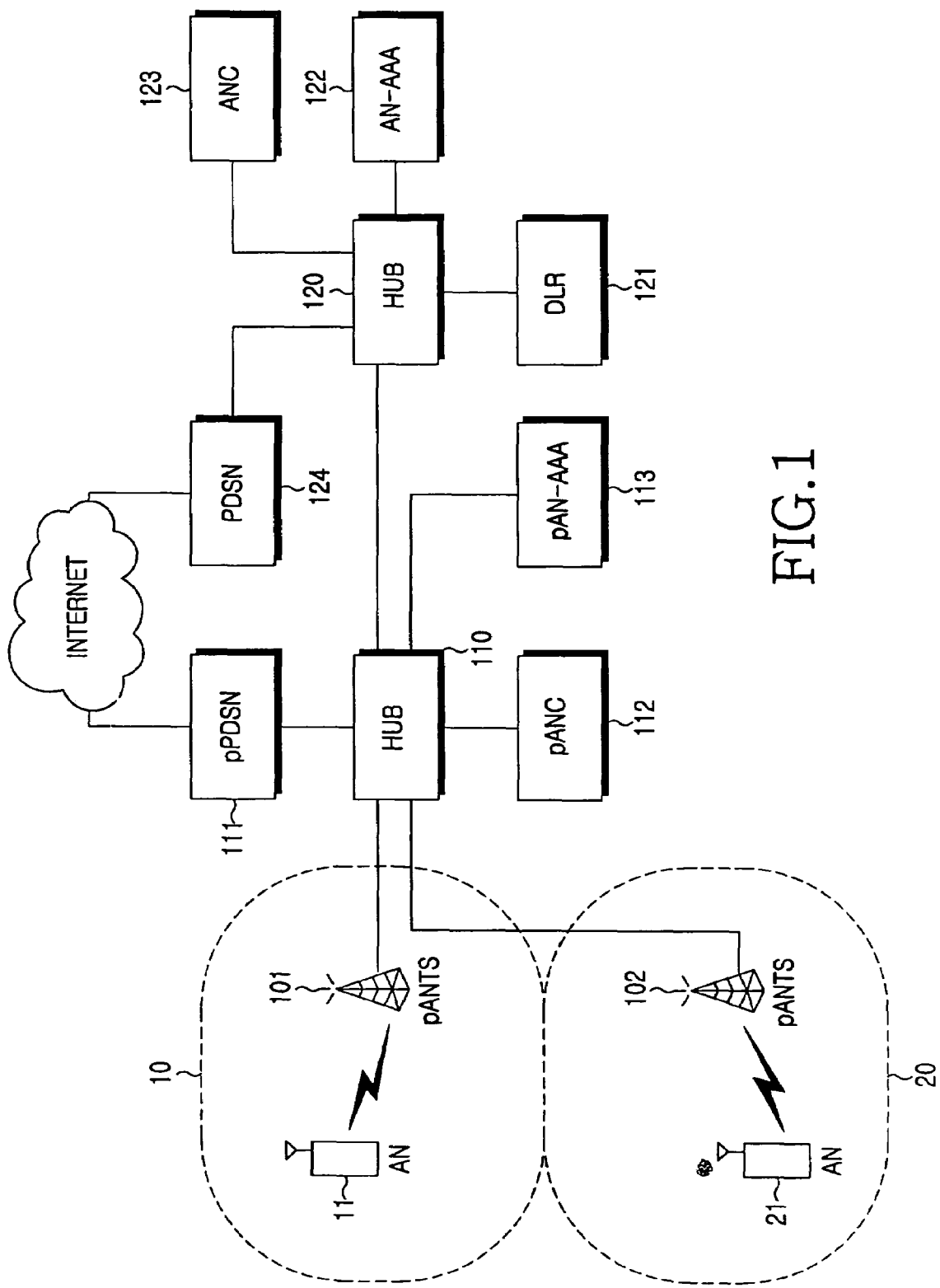
FIG. 1 is a block diagram showing a network configuration of a high-speed wireless data system for using either a public network or a private network, in accordance with the principles of the present invention.

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description of the best mode contemplated of carrying out the invention, which follows, is to be understood as being a broad, teaching disclosure directed to persons of skill in the appropriate arts, and not as limiting upon the present invention.

Illustrative embodiments of the best mode of carrying out the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Mobile communication systems have been further developed in order to provide a user with the ability to make voice phone calls while on the move, using mobile telephones. Due to technical developments in an attempt to meet the demands of users, mobile communication systems mainly for voice calls can now provide short data services. That is, mobile communication systems provide not only voice call services, but also additional services, such as short message transmission, music file transmission for bell sounds of wireless terminals, simple Internet communications, banking services, and other services. Studies have been performed to try to develop mobile communication systems which can provide mobile communication subscribers with not only the services mentioned above but also more information at higher speed. Also, preparations to commercialize such systems may now be in progress. As a system for implementing high-speed data services with a mobile communication terminal, a system termed CDMA200 1X EV-DO (hereinafter referred to as "high-speed wireless data system") has been proposed. "CDMA" is code division multiple access. The high-speed wireless data system has channels, such as a data channel for transmitting data at high speed, an augmentation channel, a signaling channel and a medium access control (MAC) channel, which are different from the channels of earlier systems. Accordingly, studies have been made regarding the standards for these channels and various data which can be carried by these channels. As stated above, the properties of the high-speed wireless data system are different from those of earlier wireless networks.

Wireless networks are divided into public wireless networks and private wireless networks. Generally, each of the private wireless networks, which is used by a group or a company for a particular purpose, is configured to interwork with a particular public wireless network. More specifically, each private wireless network should comprise a base station (ANTS) and a base station controller (ANC) which are necessary in a public wireless network, as well as a private switching system. For authentication, each private wireless network should be equipped with a visitor location register (VLR) or home location register (HLR). A private wireless network constructed with all of these components however, is simply too expensive. Furthermore, a terminal used in a private wireless network needs also be used in a public wireless network.

It would not be convenient and it would not be cost effective for a user to use two different terminals to move from a private wireless network to the outside and vice versa. If a private wireless network and a public wireless network are built for different purposes in the same area, there will be a requirement to build more than one base station in the same area or neighboring areas, thereby causing the base station builders a loss of their cost.

Therefore, a method is provided for using part of a public wireless network as a private wireless network. According to this method, a mobile terminal can be provided with private wireless network services within a certain area and with public wireless network services in other areas. This method is economically advantageous because only one base station is needed in the same area. Thus, technologies for providing different services in a certain area and in other areas have been developed.

As described above however, a high-speed wireless data system is different in many aspects from current CDMA 1X systems mainly providing voice services. It is believed to be impossible to share a public wireless network and a private wireless network with currently available CDMA 1X systems, in terms of systems that can actually be produced and utilized at a reasonable price. That is, it is believed that current systems cannot be used to share a public wireless network and a private wireless network at a reasonable price.

Furthermore, base stations and base station controllers for currently available 1X EV-DO systems use very expensive equipment, because they use asynchronous transfer mode (ATM) switches. Therefore, there is a requirement to provide low-priced base stations and base station controllers.

Thus, there appears to be a need for a new, improved, convenient, and efficient method and system enabling users to access public wireless networks and private wireless networks in a 1X EV-DO system, to receive information at a high-speed rate, for video conference calls, to watch movies received from one of the wireless networks, and for other reasons. Also, there is a requirement to provide low-priced base stations and base station controllers while providing the new, improved method and system in a 1X EV-DO system.

Exemplars of efforts related to networking and communications include: U.S. Pat. No. 6,374,102 to Brachman et al., entitled USER PROACTIVE CALL HANDLING, issued on Apr. 16, 2002, U.S. Patent Application Publication No. 2002/0167905 to Wenzel et al., entitled IDENTIFICATION OF UNUSED RESOURCES IN A PACKET DATA NETWORK, published on Nov. 14, 2002, U.S. Pat. No. 5,845,211 to Roach Jr., entitled WIRELESS DIGITAL NETWORK, issued on Dec. 1, 1998, U.S. Patent Application Publication No. 2002/0091933 to Quick Jr et al., entitled LOCAL AUTHENTICATION IN A COMMUNICATION SYSTEM, published on Jul. 11, 2002, U.S. Patent Application Publication No. 2002/0067707 to Morales et al., entitled METHOD AND APPARATUS TO CONTROL HANDOFF BETWEEN DIFFERENT WIRELESS SYSTEMS, published on Jun. 6, 2002, and U.S. Patent Application Publication No. 2002/0191595 to Mar et al., entitled PROVIDING COMMUNICATIONS CAPABILITIES TO MOBILE DEVICES AT AN ENTERPRISE, published on Dec. 19, 2002. The foregoing efforts are not without merit, but further improvements can be contemplated.

Hereinafter, a preferred embodiment of the present invention will be described with reference to the accompanying drawings. In the drawings, the same element, although depicted in different drawings, will be designated by the same reference numeral or character.

In the following description of the present invention, items such as specific server addresses and specific messages are used merely to improve understanding of the present invention. It will be apparent to those skilled in the art that the present invention is not to be limited to such specific examples. Also, in the following description of the present invention, a detailed description of known functions and configurations incorporated herein will be omitted when it may make the subject matter of the present invention rather unclear.

FIG. 1 is a block diagram showing a network configuration of a high-speed wireless data system according to one embodiment of the present invention, for using either a public network or a private network. The network configuration, function, and operation of the high-speed wireless data system according to the present invention will be described in detail with reference to FIG. 1. It should be noted that an access network transfer system (i.e., an "ANTS") has a function block that is similar to a BTS in an 1X EV-DO system. In FIG. 1, nodes which are used in a private wireless network only or in both a private wireless network and a public wireless network are represented by lower case letter "p" as a prefix before the corresponding reference symbol or label.

The high-speed wireless data terminals 11 and 21 as shown in FIG. 1 are terminals which are used in general high-speed wireless data systems. The terminals 11 and 21 can be referred to as access nodes (AN) or access terminals (AT). It is assumed that one terminal 11 is a subscriber receiving both private and public wireless network services and the other terminal 21 is a subscriber receiving public wireless network services. The base stations pANTS, a private access network transfer system 101, and pANTS 102 shown in FIG. 1 have predetermined wireless service areas 10 and 20, respectively. When a terminal enters a wireless service area, each of the base stations 101 and 102 sets a session and performs an operation necessary to assign a Unicast Access Terminal Identifier (i.e., a "UATI") required for the terminal. The pANTS performs a function similar to a BTS in a general mobile communication system, but does not assign a UATI to a terminal. Typically, only a data location register (i.e., the "DLR") assigns the UATI to a terminal, and then transmits the assigned UATI to a base station where a mobile terminal is located. At this time, the base station usually performs only an operation for transferring the UATI to the mobile terminal on a radio line. When a call is terminated at or originated from a terminal, each of the base stations performs a necessary operation accordingly. The base stations 101 and 102 are connected to a hub 110.

The hub 110 is connected to other nodes in the private wireless network and to each node in the public wireless network or another hub connected to other nodes in the public wireless network. FIG. 1 shows that the hub 110 is connected to another hub 120 which enables the hub 110 to be connected outside of the private wireless network. The hub 110 connected to each node of the private wireless network discriminates between services for a terminal or private packet data service node (pPDSN) 111 in the private wireless network and services for outside of the private wireless network when it performs routing in response to a call from a terminal within the private wireless network. In other words, a call to the inside of the private wireless network is connected to a private base station controller (pANC) 112 within the private network, while a call to the public wireless network is connected to the hub 120. An access network controller (i.e., an "ANC") has a function block that is similar to a BSC in an 1X EV-DO system. The hub 110 has predetermined server addresses utilized in determining whether or not a call is originated to the inside of the private wireless network. When there is a call to a server or a UATI terminal having the server, which has a UATI information containing a server address belonging to the predetermined server addresses in the hub 110, the call is detected as a call to the inside of the private wireless network.

For example, a UATI is assigned by a data location register (DLR) 121 to a private wireless network subscriber to have a predetermined server address. If predetermined server addresses are "samsung.co.kr,""samsung.com," etc., a terminal of the private wireless network may have an address such as "111@samsung.co.kr." If the terminal of the private wireless network requests to access one of the predetermined server addresses or originates a call to a terminal having one of the predetermined server addresses, such as the address "aaa@samsung.com," for example, the call from the terminal is detected as a call to the inside of the private wireless network. When none of the predetermined server addresses are contained in the UATIs of the terminal originating the call and of the terminal or server at which the call is requested to be terminated, the call is detected as a call to the public wireless network. In contrast, a call from a server may be determined to be a call to the private wireless network even when a UATI of only the server has a predetermined server address.

To perform intermediation of data, the hub 10 is connected to the private packet data serving node (pPDSN) 111 used by only the terminals of the private wireless network, the base station controller (pANC) 112 used in either the public wireless network or the private wireless network, and a private access network authentication accounting authorization (pAN-AAA) system 113 used in only the private wireless network. The pAN-AAA system 113 may be used in either the public wireless network or the private wireless network without a special limitation, but the description below is given under the presumption that it should be used only in the private wireless network for convenience of description. The pAN-AAA 113 can be said to either store an authentication database or to access a stored authentication database. The authentication database is for authenticating at least the private wireless network terminal.

The base station controller (pANC) 112 controls assignment of session and setting of a UATI for a terminal and authentication of the terminal by means of the system 113. A more detailed description about this control operation will be given below.

To intermediate data between nodes, the hub 120 is connected to a general access network authentication accounting authorization (i.e., "AN-AAA") 122, a base station controller (ANC) 123, a packet data serving node (PDSN) 124, and a data location register (DLR) 121 storing information of terminals. Further, the hub 120 may be connected to a base station of the public wireless network, although not shown in FIG. 1.

The packet data serving node (PDSN) 124 may be connected to other packet or serving nodes through the Internet or the private packet data serving node (pPDSN) 111. Further, the base station controller (ANC) 123 is a general base station controller of the high-speed wireless data system, and the authentication system (AN-AAA) 122 also is a general authentication system of the high-speed wireless data system, where authentication determines whether a particular subscriber belongs to the private network or belongs to the public network.

The data location register (DLR) 121 stores information about terminals of the high-speed wireless data system and their location information, and provides information about a terminal when session for the terminal is updated. Embodiments of the present invention provide a method that allows a mobile terminal for an 1X EV-DO system to be used in both a private wireless network and a public wireless network. Accordingly, a data location register has to store not only information to be provided from the private wireless network to the terminal, but also information to be provided from the public wireless network to the terminal. Specifically, the terminals in the present invention can be divided into three. First is a terminal to be used in a public network; another is a terminal to be used in a private network; and the third is a terminal to be used both the public and the private network. Accordingly, as above, there are three types of terminals in the present invention, and in case of the third terminal, the DLR has to include both information to be used in the private network and information to be used in the public network.

Data location register (DLR) 121 also stores general information corresponding to, or pertaining to, terminals in the public wireless network. The general information about each terminal in the public wireless network includes terminal information, user information, and information of service grade. The data location register (DLR) 121 stores information for receiving services from the private wireless network to a private wireless network terminal. The data location register (DLR) 121 stores information for providing or transmitting services of the private wireless network to a private wireless network terminal.

The data location register (DLR) 121 may further store information about terminals in the private wireless network according to the present invention. In this case, the information stored in the data location register (DLR) 121 may be classified into first information when the terminal operates only in the private wireless network and second information when the terminal operates in either the private wireless network or the public wireless network. The description below will be given under the presumption that the terminal operates in either the private wireless network or the public wireless network. In this case, the data location register (DLR) 121 stores not only the same information for the private wireless network as the information required for the public wireless network, but also inherent information about the private wireless network. The inherent information of the private wireless network should include service time, types of services, and service area such as servicing base station or sector, etc. Moreover, the data location register (DLR) 121 may assign a UATI to each terminal with a special engagement, where that "special engagement" is arbitrarily set according to a service that is to be provided by another business, such as a service provider. The special engagement can require that a private wireless network terminal be near a predetermined base station in a predetermined time zone, for example.

When a terminal of the private wireless network operates, an identifier which enables discrimination between connections to the private wireless network and the public wireless network may be further transmitted, as described in detail below with reference to signal flow diagrams.

The base stations 101 and 102, the base station controllers pANC 112 and ANC 123, the data location register (DLR) 121, and the packet data serving nodes pPDSN 111 and PDSN 124 may be constructed on the basis of Internet protocol (IP) to reduce the price of the system, because asynchronous transfer mode (ATM)-based connections usually employed between the base stations and the base station controllers can increase the price of the system. When the base stations 101 and 102, the base station controllers 112 and ANC 123, the data location register (DLR) 121, and the packet data serving nodes pPDSN 111 and PDSN 124 are constructed on the basis of Internet protocol (IP) as described above, interprocessor communication (IPC) can be carried out between internal boards or processors. Further, an Internet protocol (IP) address is assigned to an internal processor or board of each node. Further, an internal Internet protocol (IP) address may be assigned to each node located within a station house such as a house of a central office or a control station while a fixed Internet protocol (IP) address is assigned to each node located far from the station house, so as to prevent a lack of an Internet protocol (IP) address.

Interfacing between the base stations 101 and 102 and base station controllers 112 and ANC 123 can be carried out by means of asymmetric digital subscriber line (ADSL) modems or cable modems. The authentication systems pAN-AAA 113 and AN-AAA 122 and the packet data serving nodes pPDSN 111 and PDSN 124 do not need to be subjected to any modification, since they are originally constructed to employ the Internet protocol (IP)-basis.

Figure 2:
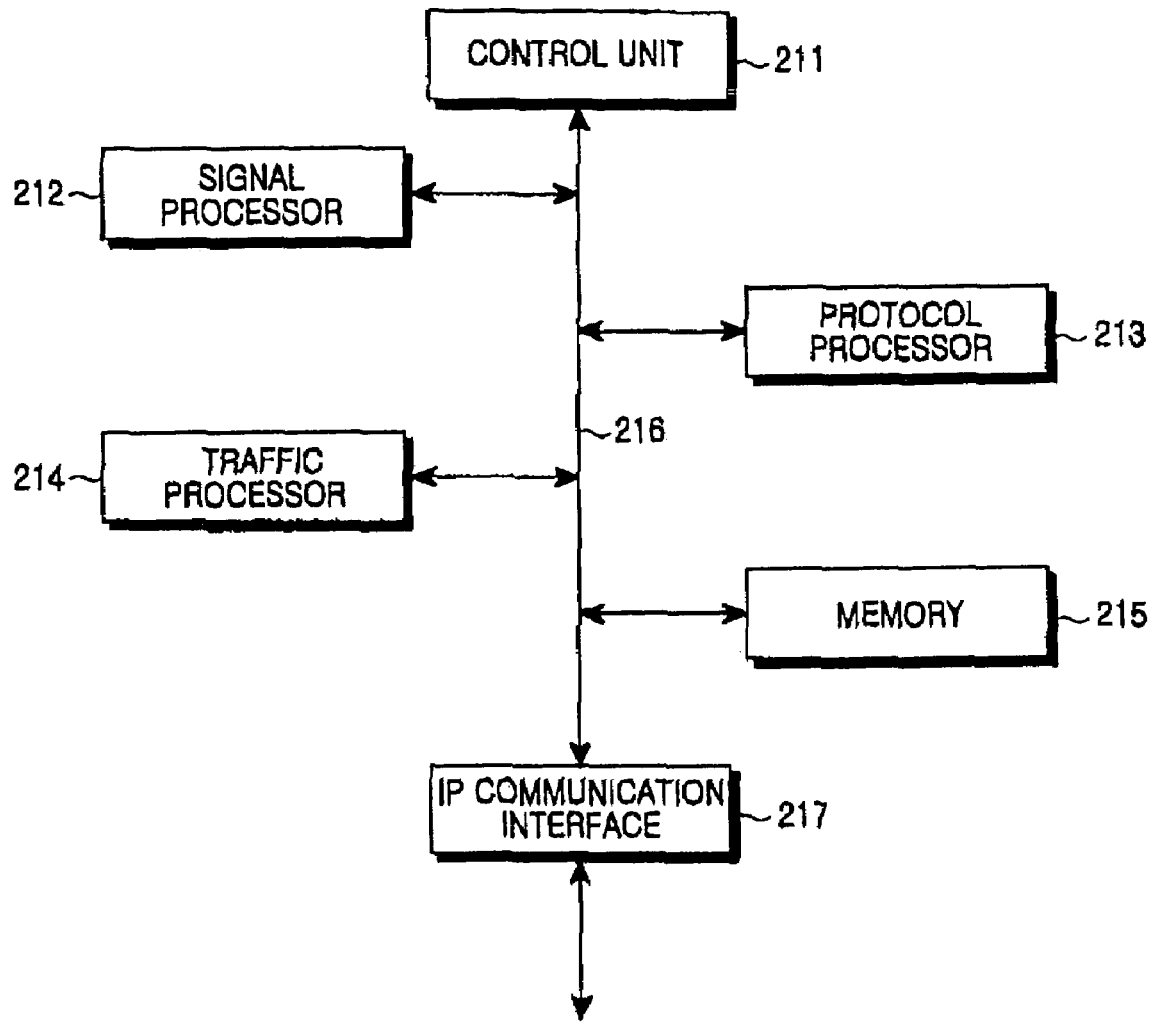
FIG. 2 is a block diagram of an IP-based base station controller which can use both public network services and private network services, in accordance with the principles of the present invention.

FIG. 2 is a block diagram of an Internet protocol (IP)-based base station controller which can use both public network services and private network services, in accordance with the principles of the present invention. The base station controller is capable of using either the public network or the private network on the basis of Internet protocol (IP) according to the present invention. Hereinafter, the construction and operation of the base station controller according to the present invention will be described in detail with reference to FIG. 2. The description below is based on a presumption that the base station controller depicted in FIG. 2 is the base station controller 112 of the private wireless network shown in FIG. 1.

A control unit 211 controls general operation of the base station controller 112. For example, the control unit 211 sets and updates sessions for authentication of terminals and performs control for assignment of UATIs, traffic control according to call setting, and various signaling control. A signal processor 212 performs various signaling processes required in the base station controller 112. For example, the signal processor 212 delivers a paging signal to a terminal or controls operations in relation to assignment of a UATI, storage of location information, and assignment and updating of session information to the data location register (DLR) 121. A protocol processor 213 processes protocols required in communication between the terminal 11 and the public packet data serving node (PDSN) 124 or private packet data serving node (pPDSN) 111, according to the control by the control unit 211.

A traffic processor 214 processes traffic transferred from the packet data serving nodes pPDSN 111 and PDSN 124 to the terminal 11, from the terminal 11 to the terminal 21, according to the control by the control unit 211. A memory 215 stores program data for the general operation of the base station controller 112, UATIs and session information of terminals located within the area of the base station controller 112, and control data and traffic data to be temporarily stored during communication. The base station controller 112 includes multiple sheets of boards.

When the control unit 211, the signal processor 212, the protocol processor 213, and the traffic processor 214, etc., have different boards from each other, each board may be provided with an Internet protocol (IP) for internal processing, so as to perform Internet protocol (IP) communication. Further, when the base station controller 112 is located far from a station house, a fixed Internet protocol (IP) may be assigned to the base station controller 112 for data transmission. The construction of the base station controller 112 as described above can be employed in the base station 101 in the same manner.

Internet protocol (IP) communication interface 217 performs interfacing of signals or traffic data transmitted or received in Internet protocol (IP) communication between the base station controller 112 and other devices. That is, the signals and data received with the Internet protocol (IP) communication protocol are converted into internally-processible types, which are then transferred to the control unit 211 and corresponding processors 212, 213, and 214 through an interprocessor communication (i.e., "IPC") line 216. Internet protocol (IP) communication interface 217 stores data in the memory 215 when buffering is necessary.

Although the above description is given about the base station controller 1112, it can be equally applied to either the base stations 101 and 102 or the base station controller ANC 123 of the public wireless network instead of the private wireless network. Further, although the hub 110 performs judgment whether the terminal belongs to the private wireless network or the public wireless network in the description of FIG. 1, the base station controller 112 may perform the judgment instead. In the latter case, the judgment may be carried out by the control unit 211 or a separate board arranged for the judgment. That is, the present invention pays attention only to performance of the judgment whether the terminal belongs to the private wireless network or the public wireless network, but no attention to the means for performing the judgment. However, it is most preferred that the hub 110 or the base station controller 112 performs the judgment, as is in the embodiments described above.

Figure 3:
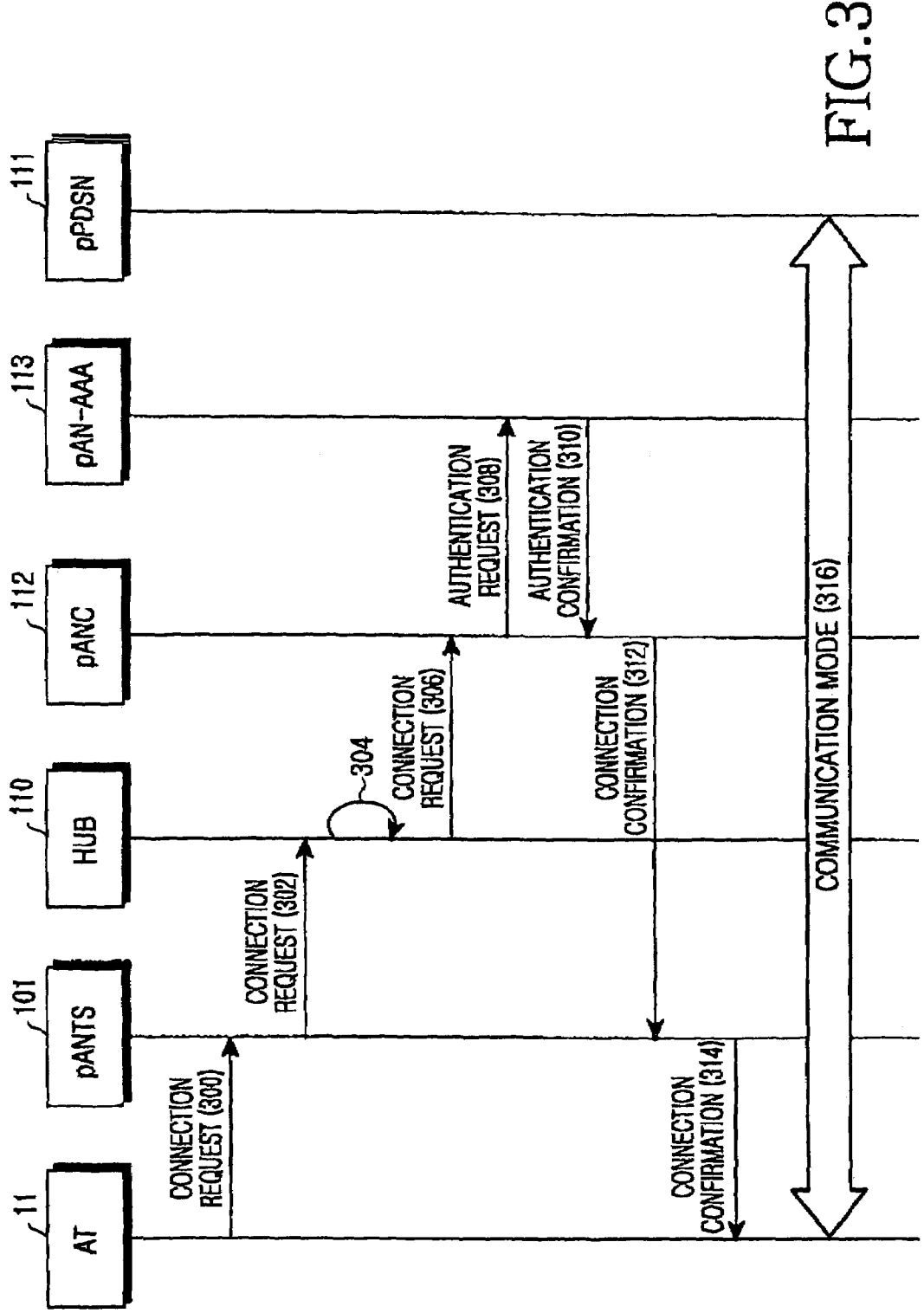
FIG. 3 shows signaling flows when a call out is required at a terminal of a private network, in accordance with the principles of the present invention.

FIG. 3 shows signaling flows when a call out is required at a terminal of a private network, in accordance with the principles of the present invention. FIG. 3 is a signal flow diagram when a terminal of the private wireless network requests origination of a call according to the present invention. Hereinafter, flow of signals and operations of systems when a terminal of the private wireless network requests origination of a call will be described in detail with reference to FIGS. 1 to 3.

At step S300, when a terminal 11 requests origination of a call through 1X EV-DO system, the terminal 11 transmits to the base station 101 an access request signal together with unicast access terminal identifier (UATI) and an address of destination according to a protocol defined in an air (wireless) interface. At step S302, when the base station 101 receives the access request signal, the base station 101 performs Internet protocol (IP) communication process and transfers the access request signal to the hub 110. At step S304, the hub 110 judges whether the received access request signal is requesting to connect with the private wireless network or the public wireless network. As described above with reference to FIG. 1, this judgment is carried out by comparing the server address of the terminal 111 with addresses stored in advance. Here, the description below is given under the presumption that access to the private wireless network is requested.

At step S306, as a result of the judgment in step S304, when access to the private wireless network is requested, the hub 110 transfers the access request signal to the base station controller 112 used for either the private wireless network or the public wireless network according to the Internet protocol (IP) communication protocol. The base station controller 112 receives the access request signal through the Internet protocol (IP) communication interface 217. Then, the Internet protocol (IP) communication interface 217 of the base station controller 112 transmits the access request signal to the signal processor 212. The signal processor 212 informs the control unit 211 that access has been requested. Then, the control unit 211 controls the signal processor 212 to transfer an authentication request signal to the private authentication system 113. The authentication request signal is transferred to the private authentication system 113 through the Internet protocol (IP) communication interface 217. In other words, at step S308, the authentication request signal is transferred from the base station controller 112 to the private authentication system 113.

When the private authentication system 113 receives the authentication request signal, the private authentication system 113 examines unicast access terminal identifier (UATI) of the terminal to determine whether the terminal has been authenticated or not. At step S310, the private authentication system 113 transfers the result of the authentication to the base station controller 112. An authentication confirmation signal, which is the result of the authentication, may imply either success or failure of the authentication. When it is confirmed that the terminal has been authenticated, the process as shown in FIG. 3 progresses. When the authentication meets with failure however, an authentication failure signal is generated and transferred to the terminal 1. The failure of the authentication is processed in the same manner as that in a general 1X EV-DO system.

In the base station controller 112, the authentication confirmation signal is received through the Internet protocol (IP) communication interface 217, transferred through the inter-processor communication (IPC) line 216, and processed by the signal processor 212 and the control unit 211. At step S312, when it is confirmed that the terminal has been authenticated, the base station 101 controls the signal processor 212 to send an access confirmation signal to the hub 110 and the base station 101.

At step S314, when the base station 101 has received the access confirmation signal through the above-described process, the base station 101 transfers the access confirmation signal through the air interface to the terminal 11. Then, at step S316, the terminal 111 having received the access confirmation signal communicates with a targeted packet data serving node pPDSN 111. In the above description, the terminal requests origination of a call to the private wireless network and thus communicates with the private packet data serving node pPDSN 111. When origination of a call to the packet data serving node PDSN 124 of the public wireless network is requested also, however, the signal is processed in the same manner as above excepting that the signal further passes through the hub 120 and the base station controller AN-AAA 122 of the public wireless network.

The transmission and reception of data are performed by the traffic processor 214 of the base station controller 112. Furthermore, the protocols of the transmitted and received data are processed by the protocol processor 213. Meanwhile, FIG. 3 does not show a process of the base station controller 112 processing the signal to the packet data serving node pPDSN 111, which is the same as a general process performed in the 1X EV-DO system, but illustrates that the access confirmation signal is transmitted to the terminal directly after the authentication and then communication is performed.

When the communication has been completed, the location of the mobile terminal can be registered through the same process as the location registration process performed in a general 1X EV-DO system.

Figure 4:
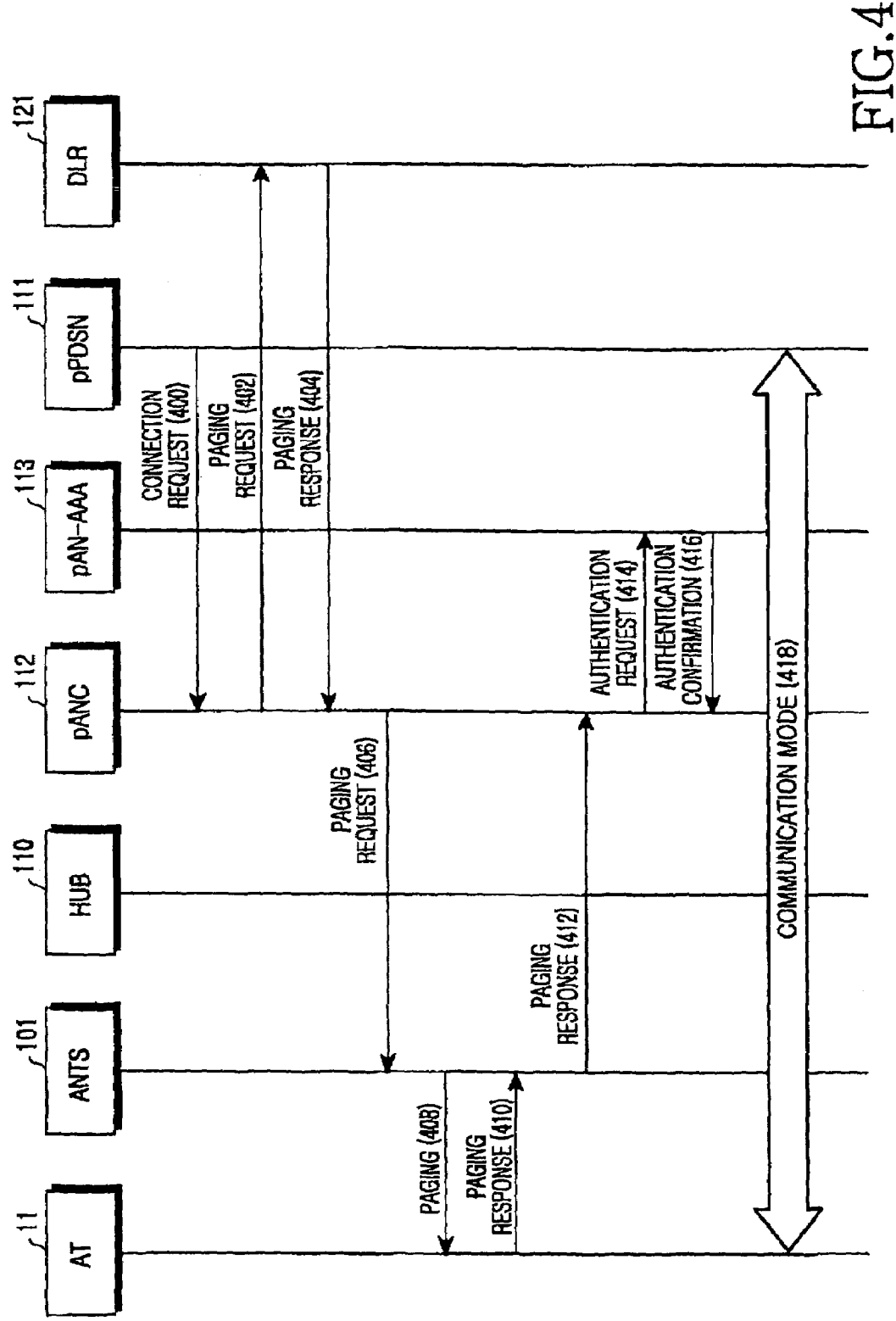
FIG. 4 shows signaling flows when a call in is required to a terminal of a private network from a private packet data service node, in accordance with the principles of the present invention.

FIG. 4 shows signaling flows when a call in is required to a terminal of a private network from a private packet data service node, in accordance with the principles of the present invention. FIG. 4 is a signal flow diagram when the private packet data serving node requests a call to be terminated at a terminal of the private wireless network according to the present invention. Hereinafter, flow of signals and operations of systems when the private packet data serving node requests a call to be terminated at a terminal of the private wireless network will be described in detail with reference to FIGS. 1, 2, and 4.

At step S400, when the private packet data serving node pPDSN 111 requests a call to be terminated at the terminal 11 of the private wireless network, the private packet data serving node pPDSN 111 transmits an access request signal to the predetermined base station controller 112. In this case, the predetermined base station controller 112 is a base station controller for controlling an operation of only the private wireless network or operations of either the private wireless network or the public wireless network. The access request signal is transferred through the hub 110, although not separately shown in FIG. 4.

When the access request signal is received, the Internet protocol (IP) communication interface 217 of the base station controller 112 transfers the access request signal to the signal processor 212 as described above in detail with reference to FIG. 3, and data processed in the signal processor 212 are transferred to the control unit 211. Then, the control unit 211 controls generation of a paging request signal to the data location register (DLR) 121. At step S402, the paging request signal is generated in the signal processor 212 and is transferred to the data location register (DLR) 121. At step S404, when the data location register (DLR) 121 receives the paging request signal, the data location register (DLR) 121 searches location information of the terminal and transfers the searched result to the base station controller 112.

When the base station controller 112 receives a paging response signal, which is the searched result, and the terminal is located within an area of a base station controlled by the base station controller 112, the base station controller 112 transmits the paging request signal to the corresponding base station. However, when the terminal is not located within the area of the base station controlled by the base station controller 112, the base station controller 112 transmits the paging request signal to the corresponding base station controller controlling a base station having an area in which the terminal is located. As an alternative method, the base station controller 112 may be connected to the corresponding base station controller by means of the packet data serving node pPDSN 111. The description below will be based on the presumption that the terminal at which the call is terminated is a terminal belonging to the private wireless network and is located within the area of the base station 101 of the private wireless network.

At step S406, when the terminal 11 is located within the area of the base station controller 112 as described above, the base station controller 112 transmits the paging request signal to the corresponding base station 101 through the hub 110. At step S408, when the base station 101 receives the paging request signal, the base station 101 performs a paging operation, which is an operation of reporting call-termination to the corresponding terminal as defined in the air interface. At step S408, it can be said that a paging signal is transmitted from base station 101 to terminal 11, or it can be said that the base station 101 pages terminal 11.

At step S410, when a user of the terminal 11 responds, the terminal 11 transmits a paging response signal or paging answer signal to the base station 101, as defined in the air interface. Then, at step S412, the base station 101 transfers the paging response signal to the base station controller 112 through the hub 110. At step S414, the base station controller 112 generates and sends an authentication request signal to the private authentication system 113 when it has received the paging response signal. In this case also, the authentication request signal is transmitted through the Internet protocol (IP) communication.

Then, at step S416, the private authentication system 113 examines whether the terminal has been authenticated or not, and generates and sends an authentication confirmation signal to the base station controller 112. The authentication confirmation signal may imply either success or failure of the authentication. At step S418, when it is confirmed that the terminal has been authenticated, the process as shown in FIG. 4 is progressed, that is, 8 communication is made between the terminal 11 and the private packet data serving node pPDSN 111. However, when the authentication meets with failure, an authentication failure signal is generated and transferred to the terminal 11 and the private packet data serving node pPDSN 111. The failure of the authentication is processed in the same manner as that in a general 1X EV-DO system.

When the communication has been completed, the location of the mobile terminal can be registered through the same process as the location registration process performed in a general 1X EV-DO system.

When a high-speed wireless data system has the construction described above according to the present invention, a user of the system can use either a public network or a private network, or both networks, and can reduce overlapping or redundant and inefficient investment. Further, the base station and the base station controller of the high-speed wireless data system employing the Internet protocol (IP) communication mode according to the present invention can reduce the price of the high-speed wireless data system.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A high-speed wireless data system for providing services for terminals of either a public wireless network or a private wireless network, the system comprising:

a first hub configured to relay data between a private base station in the private wireless network, a private base station controller in the private wireless network, a private packet data service node, a private authentication system and a second hub, to receive a call connection request signal from a terminal through the private base station, to compare a server address included in an Unicast Access Terminal Identifier (UATI) assigned to the terminal with a set of server addresses pre-stored in the first hub, to transmit the call connection request signal to the private base station controller when a server address included in the Unicast Access Terminal Identifier (UATI) assigned to the terminal is among the set of server addresses pre-stored in the first hub, and to transmit the call connection request signal to a second hub when said sever address included in the Unicast Access Terminal Identifier (UATI) is not among the set of server addresses pre-stored in the first hub;

the second hub connected to a public base station, a public base station controller, a data location register and a public network packet data service node while being connected to the first hub, the second hub receiving the call connection request signal of the terminal from the first hub and transmitting the call connection request signal to the public network base station controller; and the data location register assigning the Unicast Access Terminal Identifier corresponding to the terminal, when the terminal enters a service area of the private base station.

2. The system according to claim 1, wherein:

the base station transfers the assigned Unicast Access Terminal Identifiers (UATIs) to each of the corresponding terminals of the public wireless network and the private wireless network through a wireless channel to provide services of the high-speed wireless data system for each of the terminals;

the base station controller performs different authentications for the terminals according to the public wireless network and the private wireless network to one of which each of the terminals belongs, assignment of an UATI to each of the terminals, management of a session for each of the terminals, call connection and control of data transmitted to or received by each of the terminals;

the private authentication system includes an authentication database for authenticating the terminal of the private wireless network;

the data location register having service information of the public wireless network terminal and information receives services from the private wireless network of the private wireless network terminal; and the private packet data service node provides private wireless data services to the terminal of the private wireless network.

3. The system according to claim 2, wherein the base station and the base station controller assign an IP address for performing an IP telecommunication, and process data and signaling for the assigned IP address.

4. The system according to claim 2, wherein, upon the terminal of the private wireless network also being used in the public wireless network, the data location register stores terminal information of the private wireless network.

5. The system according to claim 2, wherein the private authentication system further includes a database for authentication of the terminal of the public wireless network.

6. A method in a high-speed wireless data system, the method comprising the steps of:

storing a plurality of server addresses in a first hub, with the first hub being communicatively connected with at least one private base station in a private network, a private base station controller in the private wireless network controlling the at least one private base station, a private packet data service node, a private authentication system and a second hub, the second hub being communicatively connected with a public base station in a public network, a public base station controller, a data location register, and a public network packet data service node, and the private base station servicing a service area and the data location register assigning an Unicast Access Terminal Identifier (UATI) to each of a plurality of mobile terminals located within the service area, with the UATI containing a server address;

receiving an access request signal, from a mobile terminal at a private base station servicing a service area where the mobile terminal is located, with the access request signal comprising a destination address and an UATI of the mobile terminal;

transmitting the access request signal from the private base station to the first hub according to the Internet protocol (IP) communication protocol;

making a determination, at the first hub, regarding whether the server address contained in the UATI received from the mobile terminal is among the plurality of server addresses stored in the first hub;

when the server address contained in the UATI received from the mobile terminal is among the plurality of server addresses stored in the first hub, transmitting the access request signal via the first hub to the private base station controller according to the Internet protocol (IP) communication protocol; and when the server address contained in the UATI received from the mobile terminal is not among the plurality of server addresses stored in the first hub, transmitting the access request signal via the first hub to the second hub according to the Internet protocol (IP) communication protocol.

7. The method of according to claim 5, the step of said making a determination further comprise, when the server address contained in a destination address in association with the call connection request signal is among the plurality of server addresses stored in the first hub, transmitting the access request signal via the first hub to the private base station controller according to the Internet protocol (IP) communication protocol.

8. The system of according to claim 1, wherein the first hub configured to transmit the call connection request signal to the private base station controller when the server address included in a destination address in association with the call connection request signal is among a set of server addresses pm-stored in the first hub.

* * * * *

UNITED STATES PATENT AND TRADEMARK OFFICE
CERTIFICATE OF CORRECTION

PATENT NO. : 7,643,466 B2  Page 1 of 1
APPLICATION NO. : 10/657278
DATED : January 5, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

Twenty-first Day of December, 2010

David J. Kappos
*Director of the United States Patent and Trademark Office*